(12) United States Patent
Koshi

(10) Patent No.: US 12,733,050 B2
(45) Date of Patent: Sep. 8, 2026

(54) COMMUNICATION SYSTEM, LICENSE MANAGEMENT SYSTEM, COMMUNICATION METHOD, RECORDING MEDIUM, AND CONTROL DEVICE

(71) Applicant: Mitsubishi Electric Corporation, Tokyo (JP)

(72) Inventor: Hirotaka Koshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 260 days.

(21) Appl. No.: 18/716,145

(22) PCT Filed: Feb. 10, 2022

(86) PCT No.: PCT/JP2022/005430
§ 371 (c)(1),
(2) Date: Jun. 4, 2024

(87) PCT Pub. No.: WO2023/152894
PCT Pub. Date: Aug. 17, 2023

(65) Prior Publication Data

US 2025/0039962 A1 Jan. 30, 2025

(51) Int. Cl.
*H04W 76/14* (2018.01)
*H04W 4/80* (2018.01)

(52) U.S. Cl.
CPC ............. *H04W 76/14* (2018.02); *H04W 4/80* (2018.02)

(58) Field of Classification Search
CPC ....... H04W 76/14; H04W 4/80; G06F 21/105; G06F 21/1011
USPC ........................................................ 455/41.2
See application file for complete search history.

(56) References Cited

U.S. PATENT DOCUMENTS

2008/0132167 A1* 6/2008 Bent ....................... H04L 69/18 455/41.2
2015/0024786 A1* 1/2015 Asrani .................. H04W 4/023 455/552.1
2016/0335421 A1 11/2016 Savage
2016/0381494 A1 12/2016 Hamada
(Continued)

FOREIGN PATENT DOCUMENTS

JP 2004-139238 A 5/2004
JP 2017-011586 A 1/2017
(Continued)

OTHER PUBLICATIONS

International Search Report and Written Opinion mailed on Apr. 26, 2022, received for PCT Application PCT/JP2022/005430, filed on Feb. 10, 2022, 8 pages including English Translation.
(Continued)

*Primary Examiner* — Don N Vo
(74) *Attorney, Agent, or Firm* — XSENSUS LLP

(57) ABSTRACT

A mobile terminal transmits information acquired from a license management server through the Internet to a license target device through near-field communication (NFC). The license target device receives the information from the mobile terminal through the NPC. An Internet connection controller in the mobile terminal disconnects connection to the Internet when the mobile terminal is adjacent to the license target device to establish connection to the license target device through the NPC.

14 Claims, 13 Drawing Sheets

(56) References Cited

U.S. PATENT DOCUMENTS

2017/0085389 A1* 3/2017 Yun ....................... H04L 12/283
2017/0303327 A1* 10/2017 Dua ......................... H04B 5/20
2022/0159471 A1* 5/2022 Li ......................... H04W 12/63

FOREIGN PATENT DOCUMENTS

JP 2017-054379 A 3/2017
WO 2016/207996 A1 12/2016

OTHER PUBLICATIONS

Notice of Reasons for Refusal mailed on Aug. 23, 2022, received for JP Application 2022-531062, 4 pages including English Translation.
Notice of Reasons for Refusal mailed on Dec. 13, 2022, received for JP Application 2022-531062, 4 pages including English Translation.
Notice of Reasons for Refusal mailed on Apr. 25, 2023, received for JP Application 2022-531062, 4 pages including English Translation.
Decision to Grant mailed on May 30, 2023, received for JP Application 2022-531062, 5 pages including English Translation.
Chinese Office Action issued Jul. 18, 2025, in corresponding Chinese Patent Application No. 202280086995.0, 12pp.
Office Action dated May 12, 2026, issued for the corresponding CN patent application No. 202280086995.0 and the partial English translation, 9pp.

* cited by examiner

FIG.5
LICENSE INFORMATION
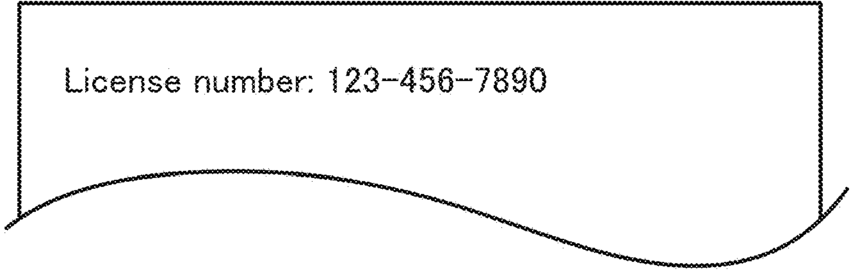
FIG.6
PAPER MEDIUM
ON WHICH TWO-DIMENSIONAL CODE IS PRINTED
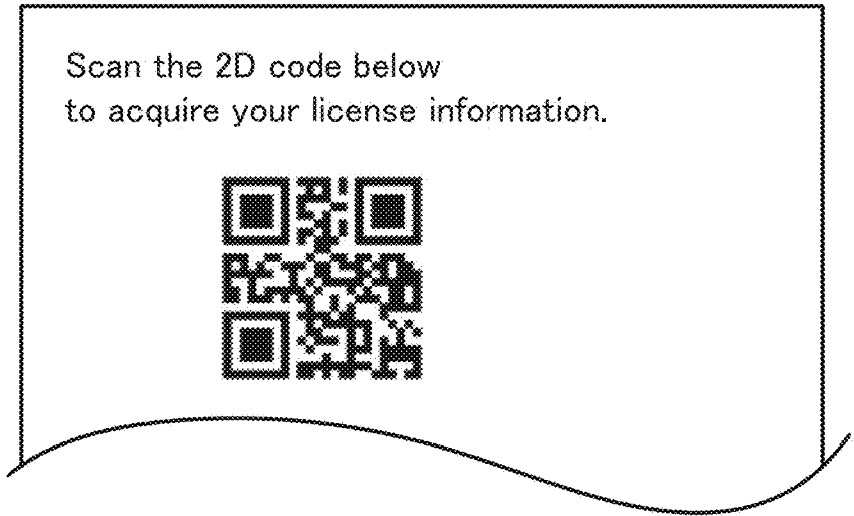
FIG.7
DEVICE IDENTIFICATION INFORMATION
Production number: ABCD-123456

FIG.8

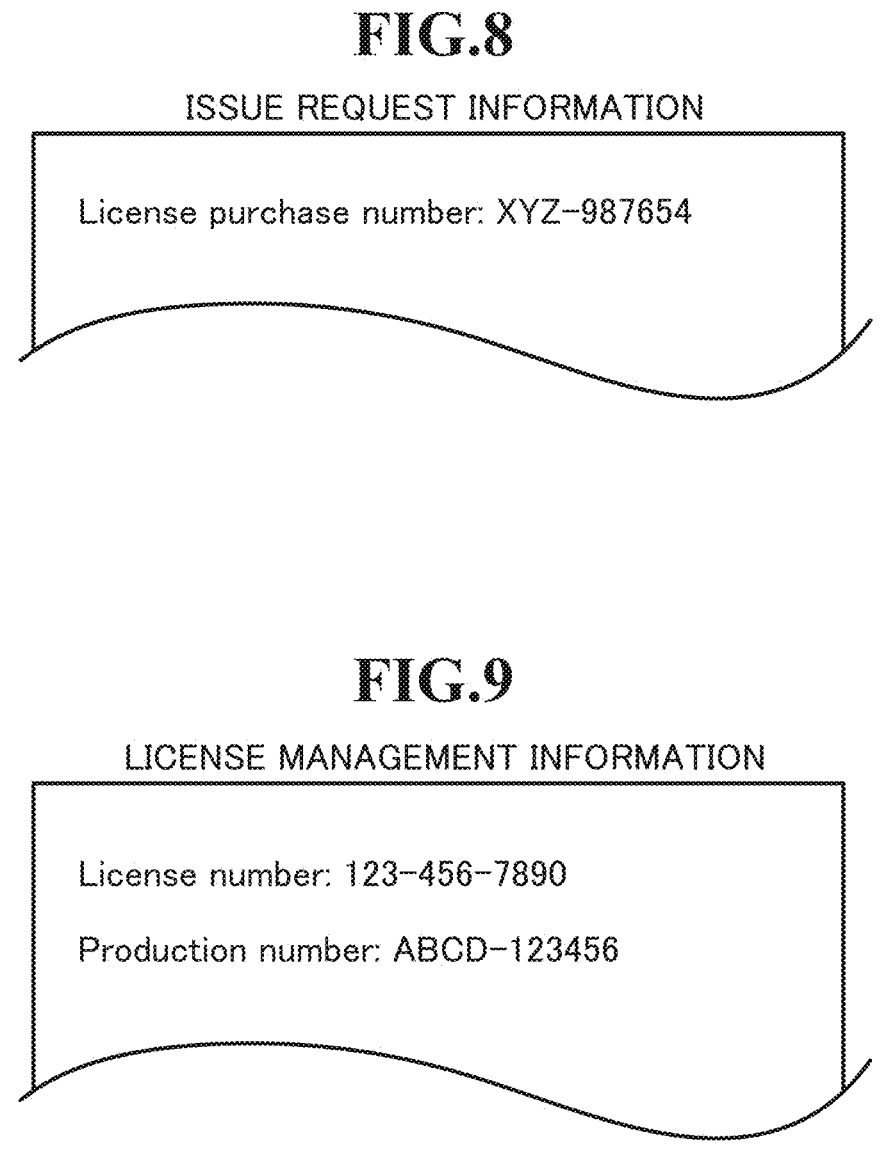

ISSUE REQUEST INFORMATION

License purchase number: XYZ-987654

FIG.9

LICENSE MANAGEMENT INFORMATION

License number: 123-456-7890

Production number: ABCD-123456

COMMUNICATION SYSTEM, LICENSE MANAGEMENT SYSTEM, COMMUNICATION METHOD, RECORDING MEDIUM, AND CONTROL DEVICE

CROSS-REFERENCE TO RELATED APPLICATION

This application is a national stage application, pursuant to 35 U.S.C. § 371, of International Patent Application No. PCT/JP2022/005430, filed Feb. 10, 2022, the entire contents of which are incorporated herein by reference.

TECHNICAL FIELD

The present disclosure relates to a communication system, a license management system, a communication method, a recording medium, and a control device.

BACKGROUND ART

In a known system, for example, a computer user or a control device user can purchase a fee-based license to use value-added functions on the device. Patent Literature 1 describes a system in which a user's mobile phone receives a license certificate from a license management server, and a user's terminal receives the license certificate from the mobile phone to allow use of software acquired by the user on the terminal.

CITATION LIST

Patent Literature

Patent Literature 1: Unexamined Japanese Patent Application Publication No. 2004-139238

SUMMARY OF INVENTION

Technical Problem

In the system described in Patent Literature 1, the user's terminal can transmit and receive data to and from external terminals through a communication network and may thus be operated in an unauthorized manner from an external terminal through the communication network. For example, a user's terminal that controls or monitors the production facility of a factory may not be connected to a communication network to avoid an unauthorized operation from external terminals. However, in the system described in Patent Literature 1, the mobile phone can always transmit and receive data to and from external terminals through a communication network, and the user's terminal may thus be operated in an unauthorized manner from an external terminal through the mobile phone.

In response to the above circumstances, an objective of the present disclosure is to reduce an unauthorized operation performed by a third person on a control device.

Solution to Problem

To achieve the above objective, a communication system according to an aspect of the present disclosure includes a mobile terminal operable by a user, and a control device configured to communicate with the mobile terminal. The mobile terminal transmits and receives information to and from an external device through a communication network, and transmits and receives information to and from the control device through short-range wireless communication. The mobile terminal includes a communication network connection controller to control connection to the communication network, and a device connection controller to control connection to the control device through the short-range wireless communication. The control device includes an information receiver to receive the information from the mobile terminal through the short-range wireless communication. The communication network connection controller disconnects the connection to the communication network when the mobile terminal is adjacent to the control device to establish connection to the control device through the short-range wireless communication.

Advantageous Effects of Invention

In the communication system according to the above aspect of the present disclosure, when the mobile terminal and the control device are connected through short-range wireless communication, no connection is established between the mobile terminal and the communication network, and an external terminal used by a third person cannot connect to the mobile terminal through the communication network. When the mobile terminal and the control device are connected, an external terminal cannot connect to the control device through the mobile terminal. In the communication system according to the above aspect of the present disclosure, the control device is thus less likely to be operated in an unauthorized manner by a third person than in a communication system in which the mobile terminal and the communication network are connected constantly when the mobile terminal and the control device are connected.

BRIEF DESCRIPTION OF DRAWINGS

FIG. 5 is a diagram of a display example of license information in Embodiment 1;

FIG. 6 is a diagram of an example paper medium in Embodiment 1;

FIG. 7 is a diagram of a display example of device identification information in Embodiment 1;

FIG. 8 is a diagram of a display example of issue request information in Embodiment 1;

FIG. 9 is a diagram of a display example of license management information in Embodiment 1;

DESCRIPTION OF EMBODIMENTS

Figure 1:
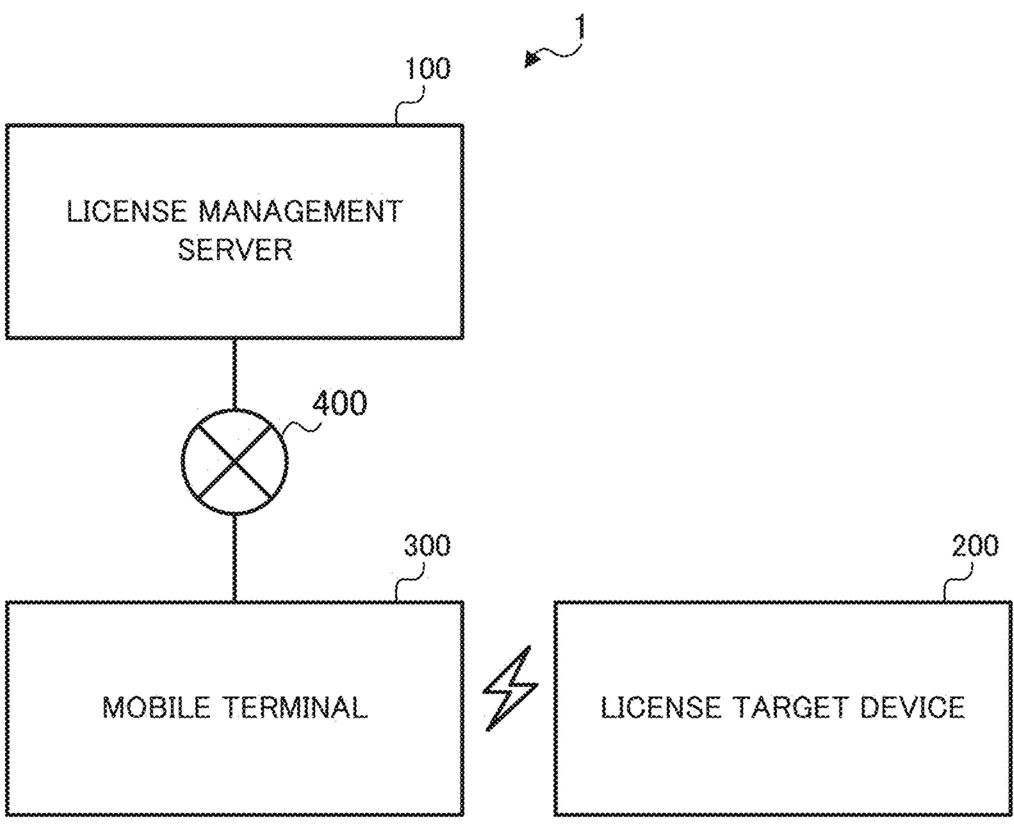
FIG. 1 is a block diagram of a license management system according to Embodiment 1.

A communication system, a license management system, a mobile terminal, a communication method, a mobile terminal communication program, and a control device according to an embodiment of the present disclosure are described in detail below with reference to the drawings. Like reference signs denote like or corresponding components in the drawings.

Embodiment 1

License Management System 1

A license management system 1 according to Embodiment 1 of the present disclosure is an example of a communication system in which, for example, the user of a device for controlling or monitoring the production facility of a factory purchases a fee-based license to use value-added functions on the control device.

As illustrated in FIG. 1, the license management system 1 includes a license management server 100 that manages a license, a license target device 200 as an example of a control device to which the license is provided, and a mobile terminal 300 used by the user of the license target device 200. The license management server 100 as an external device and the mobile terminal 300 can transmit and receive information to and from each other through an Internet 400 as an example of a communication network. In contrast, the license target device 200 cannot basically transmit or receive information to or from the license management server 100 and the mobile terminal 300 through the Internet 400. However, the license target device 200 can transmit and receive information to and from the mobile terminal 300 through near-field communication (NFC) compliant with the NFC standard as an example of short-range wireless communication. The NFC compliant with the NFC standard is hereafter simply referred to as NFC.

Figure 2:
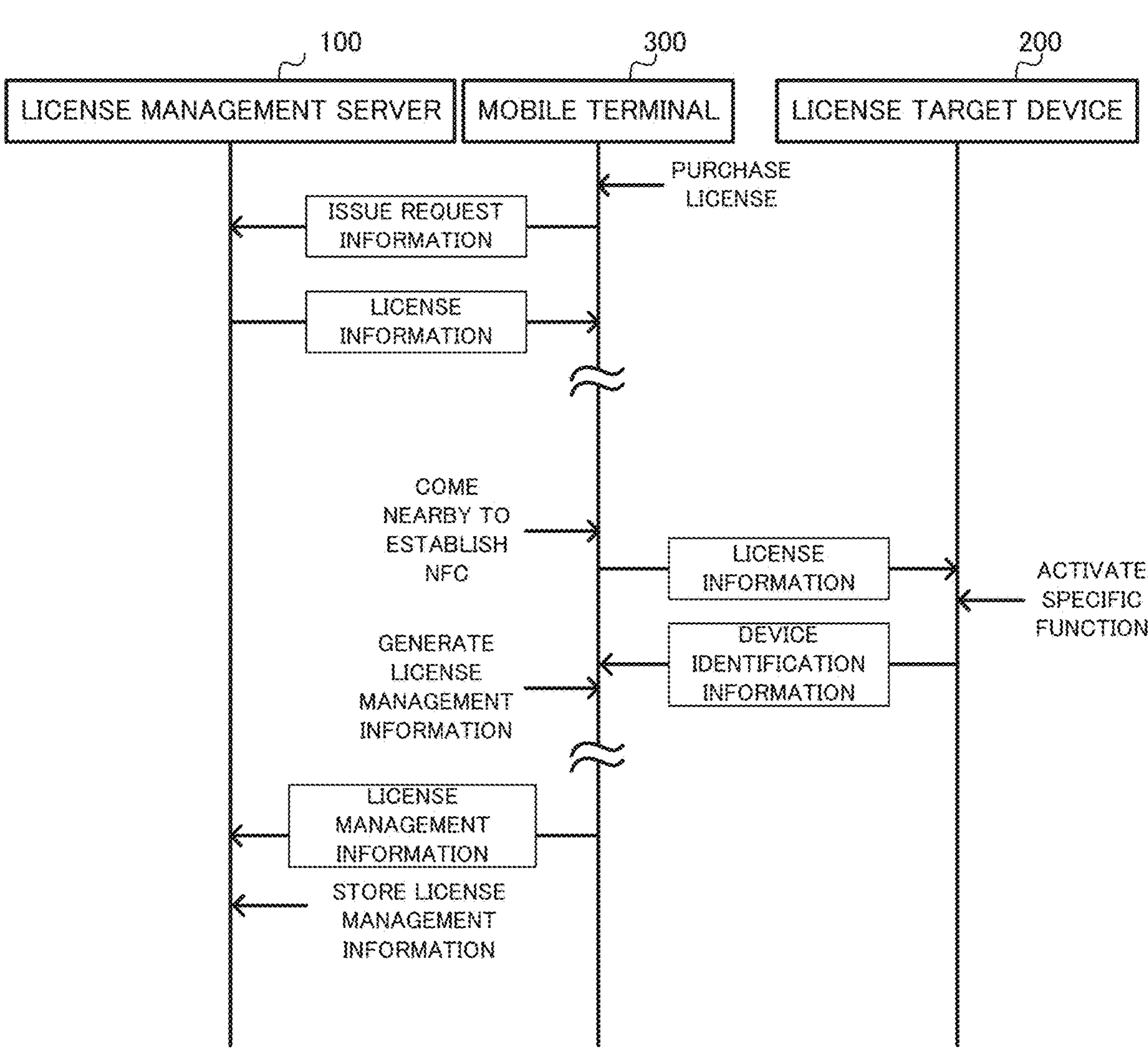
FIG. 2 is a sequence diagram indicating communication of information between devices under a license provided in Embodiment 1.

In the license management system 1, as illustrated in FIG. 2, when the user purchases a license to use a specific function on the license target device 200, the mobile terminal 300 transmits issue request information indicating a request about the issue of the license to the license management server 100. After receiving the issue request information, the license management server 100 issues license information indicating that the license is provided to the mobile terminal 300. After acquiring the license information, the mobile terminal 300 transmits the license information to the license target device 200 when the user places the mobile terminal 300 adjacent to the license target device 200 to establish NFC. After receiving the license information, the license target device 200 activates the specific function, or in other words, performs activation, based on the license information. This allows the license target device 200 to use the value-added function specified based on the license information.

The license target device 200 also transmits device identification information for identifying the license target device 200 to the mobile terminal 300. After receiving the device identification information, the mobile terminal 300 generates license management information including the device identification information and the license information and transmits the license management information to the license management server 100. After receiving the license management information, the license management server 100 stores the license management information. The storage of the license management information allows the license management server 100 to manage the license.

License Management Server 100

Figure 3:
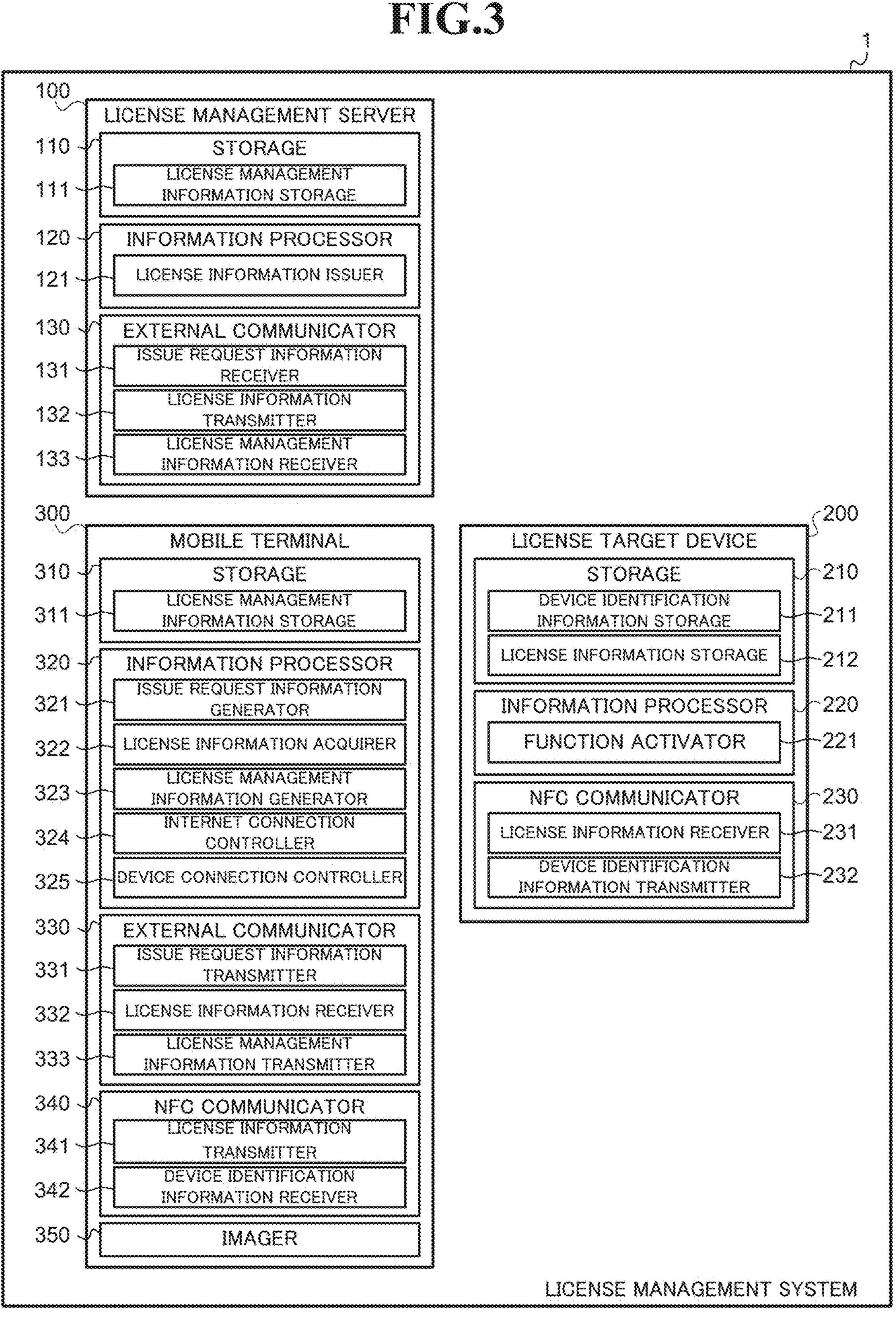
FIG. 3 is a functional block diagram of the license management system according to Embodiment 1.

The license management server 100 is, for example, a computer with the function of a database server. As illustrated in FIG. 3, the license management server 100 includes a storage 110 that stores information about license management, an information processor 120 that processes the information about license management, and an external communicator 130 that communicates with an external terminal through the Internet 400. The storage 110 includes a license management information storage 111 that stores license management information. The information processor 120 includes a license information issuer 121 that issues the license information. The external communicator 130 includes an issue request information receiver 131 that receives the issue request information, a license information transmitter 132 that transmits the license information, and a license management information receiver 133 that receives the license management information.

License Target Device 200

The license target device 200 is, for example, a Graphic Operation Terminal (GOT, registered trademark) as an example of a display. The GOT (registered trademark) is, for example, connected to a programmable logic controller (PLC) as an example of a control device that controls the production facility of the factory, and the touchscreen of the GOT displays the states of switches and sensors installed in the facility, allowing the user to operate the switches and sensors on the screen.

As illustrated in FIG. 3, the license target device 200 includes a storage 210 that stores information about license management, an information processor 220 that processes the information about license management, and an NFC communicator 230 that communicates with an external terminal through NFC. The storage 210 includes a device identification information storage 211 that stores the device identification information and a license information storage 212 that stores the license information. The information processor 220 includes a function activator 221 that activates the specific function based on the license information. The NFC communicator 230 includes a license information receiver 231 as an example of an information receiver that receives the license information and a device identification information transmitter 232 that transmits the device identification information.

Mobile Terminal 300

The mobile terminal 300 is, for example, a smartphone as an example of a user-portable computer. The mobile terminal 300 includes a storage 310 that stores information about license management, an information processor 320 that processes the information about license management, and an external communicator 330 that communicates with an external terminal through the Internet 400. The mobile terminal 300 also includes an NFC communicator 340 that communicates with an external terminal through NFC and an imager 350 that captures an image of a two-dimensional code printed on a paper medium.

The storage 310 includes a license management information storage 311 that stores the license management information. The information processor 320 includes an issue request information generator 321 that generates issue request information, a license information acquirer 322 as an example of an information acquirer that acquires the license information, and a license management information generator 323 that generates the license management information. The information processor 320 also includes an Internet connection controller 324 as an example of a communication network connection controller that controls the connection to the Internet 400, and a device connection controller 325 that controls the NFC connection to the license target device 200. The external communicator 330 as an example of an information transmitter and an information receiver includes an issue request information transmitter 331 that transmits the issue request information, a license information receiver 332 that receives the license information, and a license management information transmitter 333 that transmits the license management information. The NFC communicator 340 includes a license information transmitter 341 that transmits the license information and a device identification information receiver 342 that receives the device identification information.

Hardware Configuration of License Management Server 100

Figure 4:
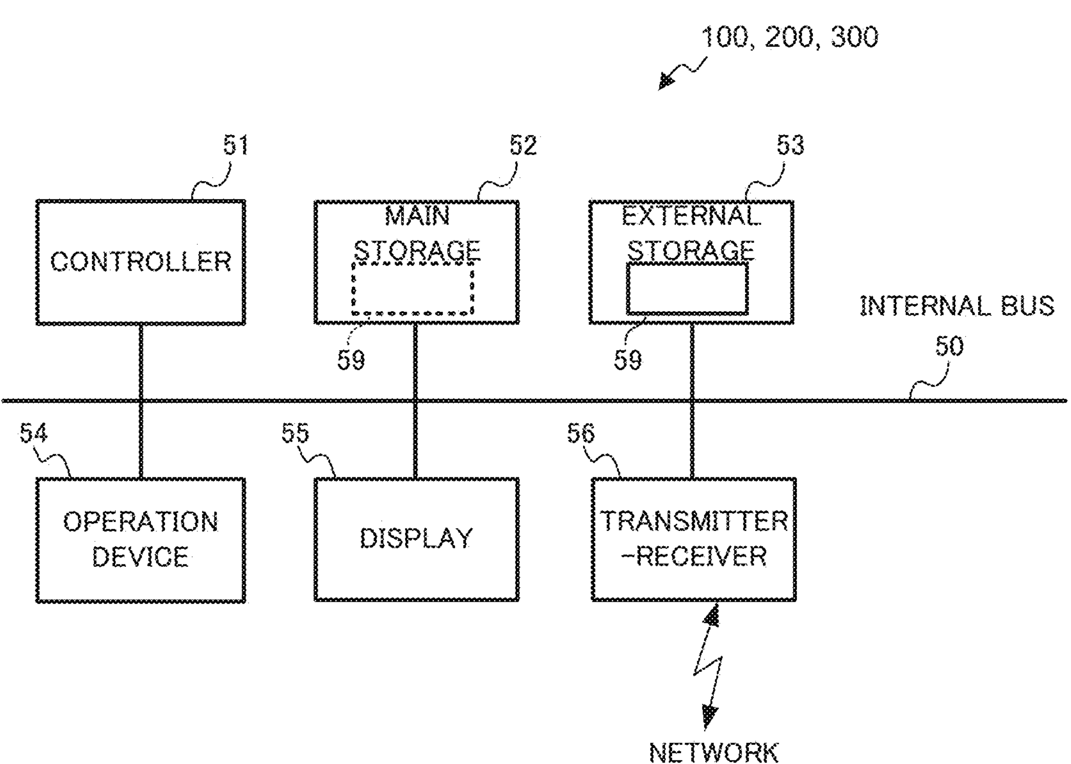
FIG. 4 is a block diagram of each device in Embodiment 1, illustrating the hardware configuration.

As illustrated in FIG. 4, the license management server 100 includes a controller 51 that performs processing in accordance with a control program 59. The controller 51 includes a central processing unit (CPU). The controller 51 functions as the license information issuer 121 illustrated in FIG. 3 in accordance with the control program 59.

Referring back to FIG. 4, the license management server 100 includes a main storage 52 into which the control program 59 is loaded. The main storage 52 is used as a work area for the controller 51. The main storage 52 includes a random-access memory (RAM).

The license management server 100 also includes an external storage 53 that prestores the control program 59. In response to an instruction from the controller 51, the external storage 53 provides data stored in the program to the controller 51 and stores data provided from the controller 51. The external storage 53 includes a nonvolatile memory such as a flash memory, a hard disk drive (HDD), or a solid state drive (SSD). The external storage 53 functions as the license management information storage 111 illustrated in FIG. 3.

Referring back to FIG. 4, the license management server 100 includes an operation device 54 operable by the user. Information input with the operation device 54 is provided to the controller 51. The operation device 54 includes information input components such as a keyboard, a mouse, and a touchscreen.

The license management server 100 also includes a display 55 that displays information input with the operation device 54 and information output from the controller 51. The display 55 includes a display device such as a liquid crystal display (LCD) or an organic electroluminescent (EL) display.

The license management server 100 also includes a transmitter-receiver 56 that transmits and receives information. The transmitter-receiver 56 includes an information communication component such as a communication network terminating device or a wireless communication device connected to a network. The transmitter-receiver 56 functions as the issue request information receiver 131, the license information transmitter 132, and the license management information receiver 133 illustrated in FIG. 3.

Referring back to FIG. 4, in the license management server 100, the main storage 52, the external storage 53, the operation device 54, the display 55, and the transmitter-receiver 56 are all connected to the controller 51 with an internal bus 50.

The license management server 100 implements the functions of the above components 111, 121, and 131 to 133 illustrated in FIG. 3 with the controller 51 using the main storage 52, the external storage 53, the operation device 54, the display 55, and the transmitter-receiver 56 as resources. For example, the license management server 100 performs a license management information storing step with the license management information storage 111. For example, the license management server 100 performs a license information issuing step with the license information issuer 121. For example, the license management server 100 performs an issue request information receiving step as an example of an information receiving step with the issue request information receiver 131, a license information transmitting step as an example of an information transmitting step with the license information transmitter 132, and a license management information receiving step as an example of an information receiving step with the license management information receiver 133.

Hardware Configuration of License Target Device 200

Similarly to the license management server 100, the license target device 200 also includes a controller 51, a main storage 52, an external storage 53, an operation device 54, a display 55, and a transmitter-receiver 56 as illustrated in FIG. 4. The controller 51 functions as the function activator 221 illustrated in FIG. 3 in accordance with the control program 59. The external storage 53 functions as the device identification information storage 211 and the license information storage 212. The transmitter-receiver 56 functions as the license information receiver 231 and the device identification information transmitter 232.

Referring back to FIG. 4, the license target device 200 implements the functions of the above components 211, 212, 221, 231, and 232 illustrated in FIG. 3 with the controller 51 using the main storage 52, the external storage 53, the operation device 54, the display 55, and the transmitter-receiver 56 as resources. For example, the license target device 200 performs a device identification information storing step with the device identification information storage 211 and a license information storing step with the license information storage 212. For example, the license target device 200 performs a function activating step with the function activator 221. For example, the license target device 200 performs a license information receiving step as an example of an information receiving step with the license information receiver 231 and a device identification information transmitting step as an example of an information transmitting step with the device identification information transmitter 232.

Hardware Configuration of Mobile Terminal 300

Similarly to the license management server 100 and the license target device 200, the mobile terminal 300 also includes a controller 51, a main storage 52, an external storage 53, an operation device 54, a display 55, and a transmitter-receiver 56 as illustrated in FIG. 4. The controller 51 functions as the issue request information generator 321, the license information acquirer 322, the license management information generator 323, the Internet connection controller 324, and the device connection controller 325 illustrated in FIG. 3 in accordance with the control program 59. The external storage 53 functions as the license management information storage 311 illustrated in FIG. 3. The transmitter-receiver 56 functions as the issue request information transmitter 331, the license information receiver 332, the license management information transmitter 333, the license information transmitter 341, and the device identification information receiver 342 illustrated in FIG. 3.

Referring back to FIG. 4, the mobile terminal 300 implements the functions of the above components 311, 321 to 325, 331 to 333, 341, and 342 illustrated in FIG. 3 with the controller 51 using the main storage 52, the external storage 53, the operation device 54, the display 55, and the transmitter-receiver 56 as resources. For example, the mobile terminal 300 performs a license management information storing step with the license management information storage 311. For example, the mobile terminal 300 performs an issue request information generating step with the issue request information generator 321, a license information acquiring step as an example of an information acquiring step with the license information acquirer 322, and a license management information generating step with the license management information generator 323. For example, the mobile terminal 300 performs an Internet connection controlling step as an example of a communication network connection controlling step with the Internet connection controller 324 and a device connection controlling step with the device connection controller 325.

For example, the mobile terminal 300 performs an issue request information transmitting step with the issue request information transmitter 331, a license information receiving step as an example of an information receiving step with the license information receiver 332, and a license management information transmitting step as an example of an information transmitting step with the license management information transmitter 333. For example, the mobile terminal 300 performs a license information transmitting step as an example of an information transmitting step with the license information transmitter 341 and a device identification information receiving step as an example of an information receiving step with the device identification information receiver 342.

Details of Functional Configuration of License Management Server 100

Referring back to FIG. 3, the license information issuer 121 issues the license information in response to a request from the user. More specifically, upon reception of the issue request information from the mobile terminal 300, the license information issuer 121 generates the license information based on the issue request information and the information stored in the storage 110. The license information is to be used to activate the specific function. For example, the license information includes information indicating a license number used as a password for activating the specific function. For example, the license information includes the character information License number: 123-456-7890 as illustrated in FIG. 5

The license information issuer 121 also issues the license information by causing the license information transmitter 132 to transmit the generated license information to the mobile terminal 300. The license information issuer 121 also generates, based on the generated license information, a two-dimensional code identifying the license information and prints the generated two-dimensional code on a paper medium. The license information issuer 121 issues the license information by causing the manager of the license management server 100 to mail the paper medium illustrated in FIG. 6 on which the two-dimensional code is printed to the user. For example, as illustrated in FIG. 6, the words "Scan the 2D code below to acquire your license information." and the two-dimensional code identifying the license information are written on the paper medium.

The issue request information receiver 131 receives the issue request information from the mobile terminal 300 through the Internet 400. When the issue request information receiver 131 receives the issue request information, the license information issuer 121 issues the license information.

The license information transmitter 132 transmits the license information to the mobile terminal 300 through the Internet 400. When issuing the license information, the license information issuer 121 causes the license information transmitter 132 to transmit the license information.

The license management information receiver 133 receives the license management information from the mobile terminal 300 through the Internet 400. When the license management information receiver 133 receives the license management information, the information processor 120 stores the license management information into the license management information storage 111.

Details of Functional Configuration License Target Device 200

Upon reception of the license information from the mobile terminal 300, the function activator 221 activates the specific function based on the license information.

The license information receiver 231 receives the license information from the mobile terminal 300 through NFC. When the license information receiver 231 receives the license information, the function activator 221 stores the license information into the license information storage 212 and activates the specific function.

The device identification information transmitter 232 transmits the device identification information to the mobile terminal 300 through NFC. When the function activator 221 activates the specific function, the information processor 220 causes the device identification information transmitter 232 to transmit the device identification information stored in the device identification information storage 211. The device identification information is to be unique to each license target device 200, or in other words, the device identification information is to be an identifier. Examples of the device identification information include information indicating the production number of the license target device 200, information indicating the serial number, and hardware identification information. For example, the device identification information is, as illustrated in FIG. 7, information including the character information Production number: ABCD-123456.

Details of Functional Configuration of Mobile Terminal 300

When the user inputs information indicating the type of the specific function requested by the user for the license target device 200, the issue request information generator 321 generates issue request information based on the information. The issue request information is to be used when the license management server 100 issues the license information, or more specifically, to identify the purchase of the license, the license target device 200, and the specific function to be activated. For example, the issue request information includes information indicating the license purchase number identifying the information input by the user to purchase the license. For example, the issue request information is, as illustrated in FIG. 8, information including the character information License purchase number: XYZ-987654.

Upon reception of the license information from the license target device 200, the license information acquirer 322 acquires the received license information. When the user receives the paper medium and captures, with the imager 350, an image of the two-dimensional code printed on the paper medium, the license information acquirer 322 acquires the license information by identifying the license information from the captured image.

After the reception of the device identification information from the license target device 200, the license management information generator 323 generates the license management information including the received device identification information and the license information temporarily stored in the license management information storage 311. The license management information is created by simply connecting the license information and the device identification information. For example, the license management information is, as illustrated in FIG. 9, created by simply connecting the character information License number: 123-456-7890 and the character information Production number: ABCD-123456. The license management information generator 323 also stores the generated license management information into the license management information storage 311 by updating the license information temporarily stored in the license management information storage 311 with the license management information.

The Internet connection controller 324 controls connection to the Internet 400. The Internet connection controller 324 establishes connection to the Internet 400 when the mobile terminal 300 is far from the license target device 200.

When the mobile terminal 300 is adjacent to and is within about several centimeters from the license target device 200, the device connection controller 325 establishes NFC connection to the license target device 200. In contrast, when the mobile terminal 300 is far from the license target device 200, the device connection controller 325 establishes no NFC connection to the license target device 200. When the NFC connection to the license target device 200 remains established, the Internet connection controller 324 establishes no connection to the Internet 400. More specifically, when the mobile terminal 300 is adjacent to the license target device 200, the Internet connection controller 324 disconnects the connection to the Internet 400 before establishing NFC connection to the license target device 200. When the mobile terminal 300 is moved away from the license target device 200, the Internet connection controller 324 establishes NFC connection to the Internet 400 after disconnecting the connection to the license target device 200.

The issue request information transmitter 331 transmits issue request information to the license management server 100 through the Internet 400. When the issue request information generator 321 generates the issue request information, the information processor 320 transmits the issue request information to the issue request information transmitter 331.

The license information receiver 332 receives the license information from the license management server 100 through the Internet 400. When the license information receiver 332 receives the license information, the license information acquirer 322 temporarily stores the license information into the license management information storage 311.

The license management information transmitter 333 transmits the license management information to the license management server 100 through the Internet 400. When the license management information generator 323 generates the license management information, the information processor 320 transmits the license management information to the license management information transmitter 333.

The license information transmitter 341 transmits the license information to the license target device 200 through NFC. The information processor 320 causes the license information transmitter 341 to transmit the license information after the device connection controller 325 establishes NFC connection to the license target device 200.

The device identification information receiver 342 receives the device identification information from the license target device 200 through NFC. When the device identification information receiver 342 receives the device identification information, the license management information generator 323 generates the license management information and stores the generated license management information into the license management information storage 311.

Internet Connection Control

Figure 10:
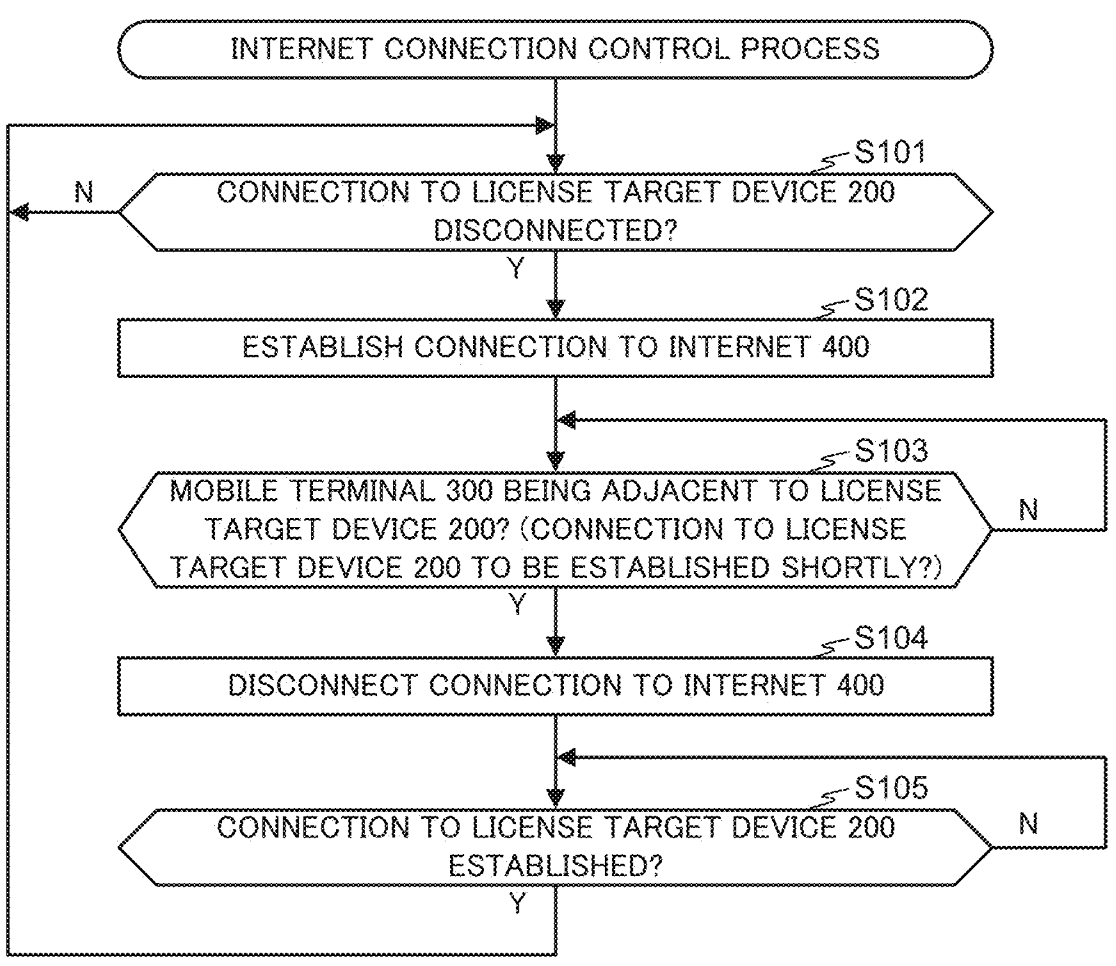
FIG. 10 is a flowchart of an Internet connection control process in Embodiment 1.

An operation performed by the mobile terminal 300 for controlling the connection to the Internet 400 is described below with reference to a flowchart. The mobile terminal 300 starts the Internet connection control illustrated in FIG. 10 when powered on. The Internet connection controller 324 first determines whether the NFC connection to the license target device 200 is disconnected (step S101). When the connection to the license target device 200 remains connected (N in step S101), the Internet connection controller 324 repeats the processing in step S101 until the connection to the license target device 200 is disconnected.

When the connection to the license target device 200 is disconnected (Y in step S101), the Internet connection controller 324 establishes connection to the Internet 400 (step S102). The Internet connection controller 324 also determines whether the mobile terminal 300 is adjacent to the license target device 200 to shortly establish NFC connection to the license target device 200 (step S103). When the mobile terminal 300 is far from the license target device 200 (N in step S103), the Internet connection controller 324 repeats the processing in step S103 until the mobile terminal 300 comes adjacent to the license target device 200.

When the mobile terminal 300 comes adjacent to the license target device 200 (Y in step S103), the Internet connection controller 324 disconnects the connection to the Internet 400 (step S104) and determines whether NFC connection to the license target device 200 is established (step S105). When no NFC connection to the license target device 200 is established (N in step S105), the Internet connection controller 324 repeats the processing in step S105 until connection to the license target device 200 is established. When NFC connection to the license target device 200 is established (Y in step S105), the Internet connection controller 324 returns to step S101. The Internet connection controller 324 then repeats the processing in steps S101 to S105.

As described above, the license management system 1 according to the present embodiment allows the license management server 100 and the mobile terminal 300 to transmit and receive information to and from each other through the Internet 400 unless the mobile terminal 300 and the license target device 200 are connected through NFC. The license management server 100 and the mobile terminal 300 cannot transmit or receive information to or from the license target device 200 through the Internet 400. The mobile terminal 300 can transmit and receive information to and from the license target device 200 through NFC. In this system, the license management server 100 receives issue request information from the mobile terminal 300 through the Internet 400 and issues license information. After the acquisition of the license information from the license management server 100, when the user places the mobile terminal 300 adjacent to the license target device 200, the mobile terminal 300 transmits the license information to the license target device 200 through NFC. The license target device 200 receives the license information from the mobile terminal 300 through NFC and activates the specific function based on the license information.

In this manner, the license management system 1 according to the present embodiment prevents direct connection to the license target device 200 from a remotely located external device, such as an Internet-connected terminal used by an unauthorized third person. Additionally, in the license management system 1 according to the present embodiment, when the user places the mobile terminal 300 adjacent to the license target device 200, the mobile terminal 300 establishes no Internet connection to an external device. In this case, the mobile terminal 300 establishes NFC connection to the license target device 200. In the license management system 1 according to the present embodiment, the license target device 200 is thus less likely to be connected by an external device through the mobile terminal 300 than in a license management system in which no NFC connection is established between the mobile terminal and the license target device. As a result, in the license management system 1 according to the present embodiment, the license target device 200 is less likely to be operated in an unauthorized manner from an external device used by a third person. Examples of unauthorized operations on the license target device 200 from a third person may include falsifications or thefts of license management information such as license information or device identification information, falsifications or thefts of information about the production facility of the factory, and malicious control of the facility.

In the license management system 1 according to the present embodiment, when the user places the mobile terminal 300 adjacent to the license target device 200, the license target device 200 automatically acquires the license information from the mobile terminal 300 to automatically activate the specific function. The license management system 1 according to the present embodiment thus activates the specific function on the license target device 200 with the user's operation that is more intuitive and easier than in a license management system in which no specific function is automatically activated when the mobile terminal is placed adjacent to the license target device. Additionally, the license management system 1 according to the present embodiment reduces the workload on the user compared with a license management system in which the license information acquired by the mobile terminal is manually input directly by the user into the license target device. The license management system 1 according to the present embodiment also reduces the lead time from the acquisition of the license information by the user to the activation of the specific function on the license target device 200 compared with a license management system in which the license information acquired by the mobile terminal is manually input directly by the user in to the license target device.

The license management system 1 according to the present embodiment allows the license information to be transmitted to the license target device 200 using a widely used mobile terminal 300 that supports NFC. For example, the user already owns or is ready to own such a mobile terminal 300. The license management system 1 according to the present embodiment is thus built more easily and is less costly than a license management system in which no license information is transmitted to the license target device using a mobile terminal that supports NFC.

The license management system 1 according to the present embodiment allows the mobile terminal 300 to acquire the license information by receiving the license information from the license management server 100 through the Internet 400.

The license management system 1 according to the present embodiment can thus reduce the lead time from the issue of the license to the activation of the specific function on the license target device 200 compared with a license management system in which the user acquires the license information from a mailed paper medium. The license management system 1 according to the present embodiment allows the license to be delivered and managed by both the license manager and the user more easily than a license management system in which the user acquires the license information from a mailed paper medium.

In the license management system 1 according to the present embodiment, the Internet connection controller 324 in the mobile terminal 300 maintains disconnection to the Internet 400 when the mobile terminal 300 is adjacent to the license target device 200 and connected to the license target device 200 through NFC.

In this manner, in the license management system 1 according to the present embodiment, when the NFC connection remains connected, no connection is established between the mobile terminal 300 and the Internet 400, and any external terminal cannot connect to the mobile terminal 300 through the Internet 400. When the mobile terminal 300 and the license target device 200 are connected through NFC, any external terminal cannot connect to the license target device 200 through the mobile terminal 300. As a result, in the license management system 1 according to the present embodiment, the license target device 200 is less likely to be operated in an unauthorized manner by a third person than in a license management system in which the mobile terminal and the communication network are connected when the mobile terminal and the license target device are connected.

In the license management system 1 according to the present embodiment, when receiving the license information, the license target device 200 transmits the device identification information to the mobile terminal 300 through NFC. The mobile terminal 300 receives the device identification information from the license target device 200 through NFC to generate license management information and transmits the license management information to the license management server 100 through the Internet 400. The license management server 100 receives the license management information from the mobile terminal 300 through the Internet 400 and stores the received information.

In this manner, the license management system 1 according to the present embodiment allows storage of the license management information containing the license information and the device identification information linked together. The license management system 1 according to the present embodiment can thus manage the issued license in a manner that allows the system to identify the license target device 200 to which the license is provided. As a result, the license management system 1 according to the present embodiment can detect unauthorized use of the license more easily than a license management system in which no license management information is used for license management, thus reducing the workload of managing the license consumption or the license allocation to the license target device 200.

The license management system 1 according to the present embodiment allows the mobile terminal 300 to generate the license management information, and the license management server 100 may not generate the license management information containing the license information and the device identification information linked together. The license management system 1 according to the present embodiment can thus reduce the workload of managing the license by the license management server 100 compared with a license management system in which the license management server generates the license management information. Additionally, when the user, for example, uses multiple license target devices 200 and accordingly manages multiple licenses, the license management system 1 according to the present embodiment allows the mobile terminal 300 to manage each of the multiple licenses for the corresponding license target device 200. The license management system 1 according to the present embodiment can thus reduce the workload of managing licenses by the user.

In the license management system 1 according to the present embodiment, when the mobile terminal 300 transmits or receives information through NFC and then is moved away from the license target device 200 to disconnect the connection, the Internet connection controller 324 in the mobile terminal 300 establishes connection to the Internet 400. When being moved away from the license target device 200 to establish connection to the Internet 400, the mobile terminal 300 transmits the generated license management information to the license management server 100.

In the license management system 1 according to the present embodiment, when an external terminal becomes connectable to the mobile terminal 300 through the Internet 400, the NFC connection between the mobile terminal 300 and the license target device 200 is disconnected. When the mobile terminal 300 and the license target device 200 are connected, an external terminal cannot connect to the license target device 200 through the mobile terminal 300. As a result, in the license management system 1 according to the present embodiment, the license target device 200 is less likely to be operated in an unauthorized manner by a third person than in a license management system in which the mobile terminal establishes connection to the communication network before disconnecting the connection between the mobile terminal and the license target device.

Embodiment 2

In the license management system 1 according to Embodiment 1, the mobile terminal 300 generates the license management information using the device identification information transmitted from the license target device 200 through NFC. However, the present disclosure is not limited to the embodiment. The mobile terminal 300 may not receive the device identification information from the license target device 200 through NFC. In a license management system 1 according to Embodiment 2, the mobile terminal 300 acquires the device identification information about the license target device 200 input by the user. The license management system 1 according to Embodiment 2 is described in detail below with reference to FIGS. 11 and 12. In Embodiment 2, components different from the components in Embodiment 1 are described, and the same components as in Embodiment 1 are not described to avoid redundancy.

License Management System 1

Figure 11:
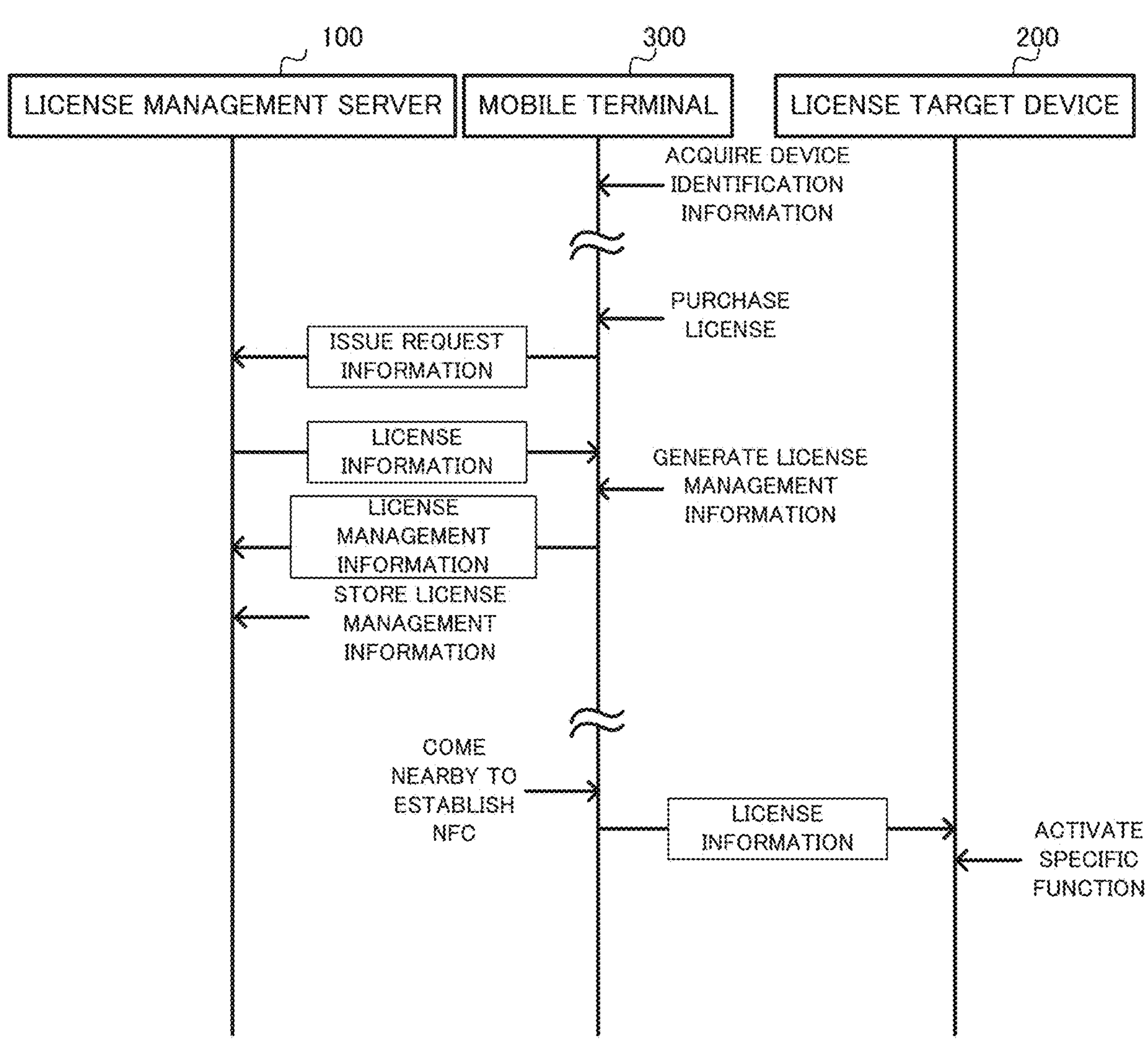
FIG. 11 is a sequence diagram illustrating communication of information between devices under a license provided in Embodiment 2.

As illustrated in FIG. 11, in the license management system 1, after acquiring the license information, the mobile terminal 300 generates license management information including the license information and the preacquired device identification information and transmits the license management information to the license management server 100. The license management server 100 thus receives the license management information before storing the license management information. The mobile terminal 300 transmits the license information to the license target device 200 when the user places the mobile terminal 300 adjacent to the license target device 200 to establish NFC. After receiving the license information, the license target device 200 activates the specific function based on the license information.

License Target Device 200

Figure 12:
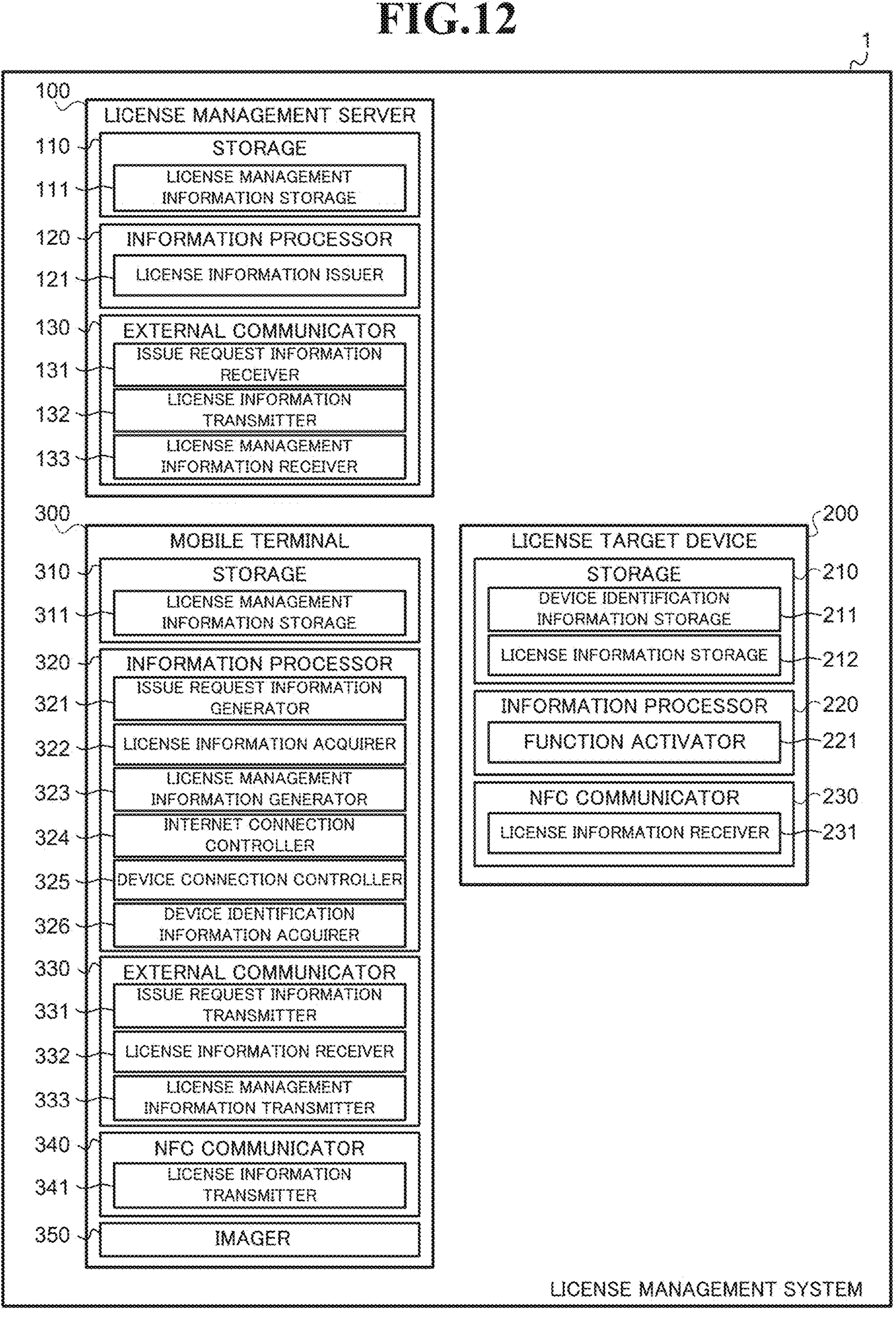
FIG. 12 is a block diagram of a license management system according to Embodiment 2.

As illustrated in FIG. 12, the license target device 200 according to the present embodiment does not include the device identification information transmitter 232 in the NFC communicator 230.

Mobile Terminal 300

In the mobile terminal 300 according to the present embodiment, the information processor 320 further includes a device identification information acquirer 326 as an example of an information acquirer that acquires device identification information, whereas the NFC communicator 340 does not include the device identification information receiver 342.

Hardware Configuration of Mobile Terminal 300

Referring back to FIG. 4, the controller 51 in the mobile terminal 300 functions as the device identification information acquirer 326 illustrated in FIG. 12 in accordance with the control program 59. The mobile terminal 300 implements the functions of the above components 311, 321 to 326, 331 to 333, and 341 illustrated in FIG. 12 with the controller 51 using the main storage 52, the external storage 53, the operation device 54, the display 55, and the transmitter-receiver 56 as resources. For example, the mobile terminal 300 performs a device identification information acquiring step as an example of an information acquiring step with the device identification information acquirer 326.

Details of Functional Configuration of Mobile Terminal 300

Referring back to FIG. 12, the device identification information acquirer 326 acquires the device identification information input by the user. The device identification information may be, for example, constantly displayed on the license target device 200 or may be displayed as appropriate on the screen of the license target device 200. In this case, the user may check the license target device 200 to input the device identification information using the operation device 54 in the mobile terminal 300. The device identification information may be displayed otherwise. For example, a two-dimensional code generated based on the device identification information and identifying the device identification information may be constantly displayed on the license target device 200, or the two-dimensional code may be displayed as appropriate on the screen of the license target device 200. In this case, when the user captures an image of the two-dimensional code with the imager 350, the device identification information acquirer 326 acquires the device identification information by identifying the device identification information from the captured image.

Upon reception of the license information from the license management server 100, the license management information generator 323 generates license management information including the received license information and the preacquired device identification information. The license management information generator 323 also stores the generated license management information into the license management information storage 311 and causes the license management information transmitter 333 to transmit the generated license management information.

In the license management system 1 according to the present embodiment, as described above, the mobile terminal 300 acquires the device identification information before the license is purchased. When receiving the license information, the license target device 200 thus transmits no device identification information to the mobile terminal 300 through NFC.

In this manner, the license management system 1 according to the present embodiment allows the license management information to be generated without the mobile terminal 300 receiving the device identification information from the license target device 200 through NFC.

In the license management system 1 according to the present embodiment, when receiving the license information from the license management server 100, the mobile terminal 300 transmits the generated license management information to the license management server 100. More specifically, the mobile terminal 300 receives the license information and then is placed adjacent to the license target device 200 to establish connection after the mobile terminal 300 transmits the license management information to the license management server 100 through the Internet 400 already connected.

In this manner, when an external terminal is connectable to the mobile terminal 300 through the Internet 400, the license management system 1 according to the present embodiment causes no NFC connection to be established between the mobile terminal 300 and the license target device 200.

The license management system 1 according to the present embodiment produces the same advantageous effects as the license management system 1 according to Embodiment 1.

Embodiment 3

In the license management system 1 according to Embodiment 1, the single license target device 200 acquires the license information from the mobile terminal 300 and activates the specific function. However, the license management system 1 may include multiple license target devices 200 rather than the single license target device 200. A license management system 1 according to Embodiment 3 includes a first license target device 201 and a second license target device 202 that acquire license information from the mobile terminal 300 to activate the specific function.

The license management system 1 according to Embodiment 3 is described in detail below with reference to FIGS. 13 to 16. In Embodiment 3, components different from the components in Embodiment 2 are described, and the same components as in Embodiment 2 are not described to avoid redundancy.

License Management System 1

Figure 13:
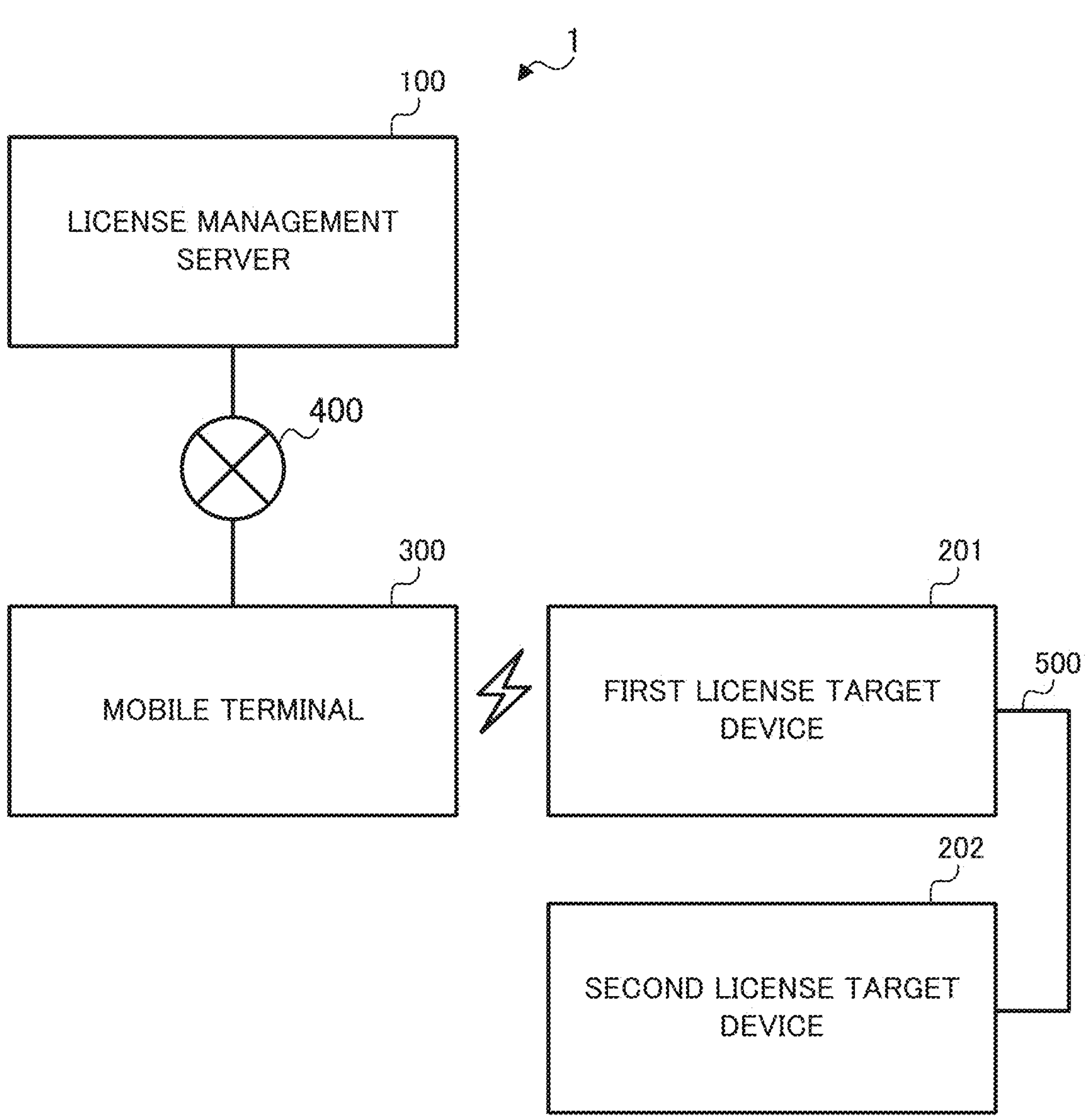
FIG. 13 is a block diagram of a license management system according to Embodiment 3.

As illustrated in FIG. 13, the license management system 1 includes the first license target device 201 and the second license target device 202 in place of the license target device 200 as examples of a control device. The first license target device 201 or the second license target device 202 cannot basically transmit or receive information to or from the license management server 100 and the mobile terminal 300 through the Internet 400. The first license target device 201 and the second license target device 202 can transmit and receive information to and from the mobile terminal 300 through NFC. The first license target device 201 and the second license target device 202 can transmit and receive information to and from each other through a closed network 500 that is a closed communication network unconnectable to the Internet 400. The closed network 500 may be, for example, a wired or wireless local area network (LAN) provided in the factory and unconnected to the Internet 400.

Figure 14:
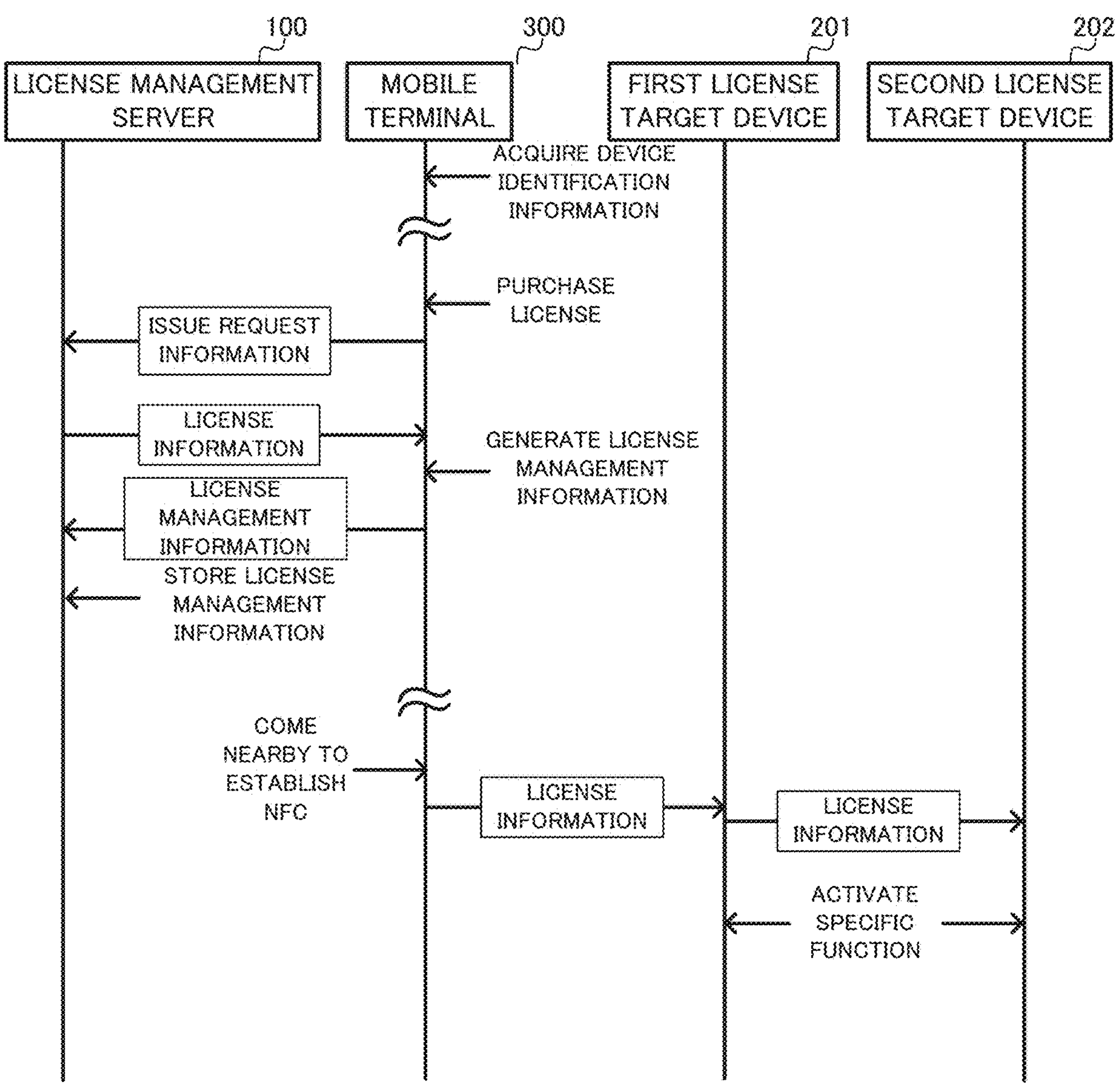
FIG. 14 is a sequence diagram illustrating communication of information between devices under a license provided in Embodiment 3.

The license management system 1 according to the present embodiment allows the user to purchase licenses for the first license target device 201 and the second license target device 202 in a single deal. As illustrated in FIG. 14, after acquiring the license information, the mobile terminal 300 generates license management information including the license information and the preacquired device identification information about the license target devices 201 and 202 and transmits the license management information to the license management server 100. The license management server 100 receives and stores the license management information. The mobile terminal 300 transmits the license information when the user places the mobile terminal 300 adjacent to the first license target device 201 or the second license target device 202 to establish NFC. For example, when the user places the mobile terminal 300 adjacent to the first license target device 201 to establish NFC, the mobile terminal 300 transmits the license information to the first license target device 201.

The license target device 201 or 202 that has received the license information shares the license information with the other of the license target devices 201 and 202. For example, when the first license target device 201 receives the license information, the first license target device 201 transmits the license information to the second license target device 202 through the closed network 500. The license target devices 201 and 202 then activate the specific function based on the license information. This allows the license target devices 201 and 202 to use the value-added function specified based on the license information.

License Target Devices 201 and 202

Figure 15:
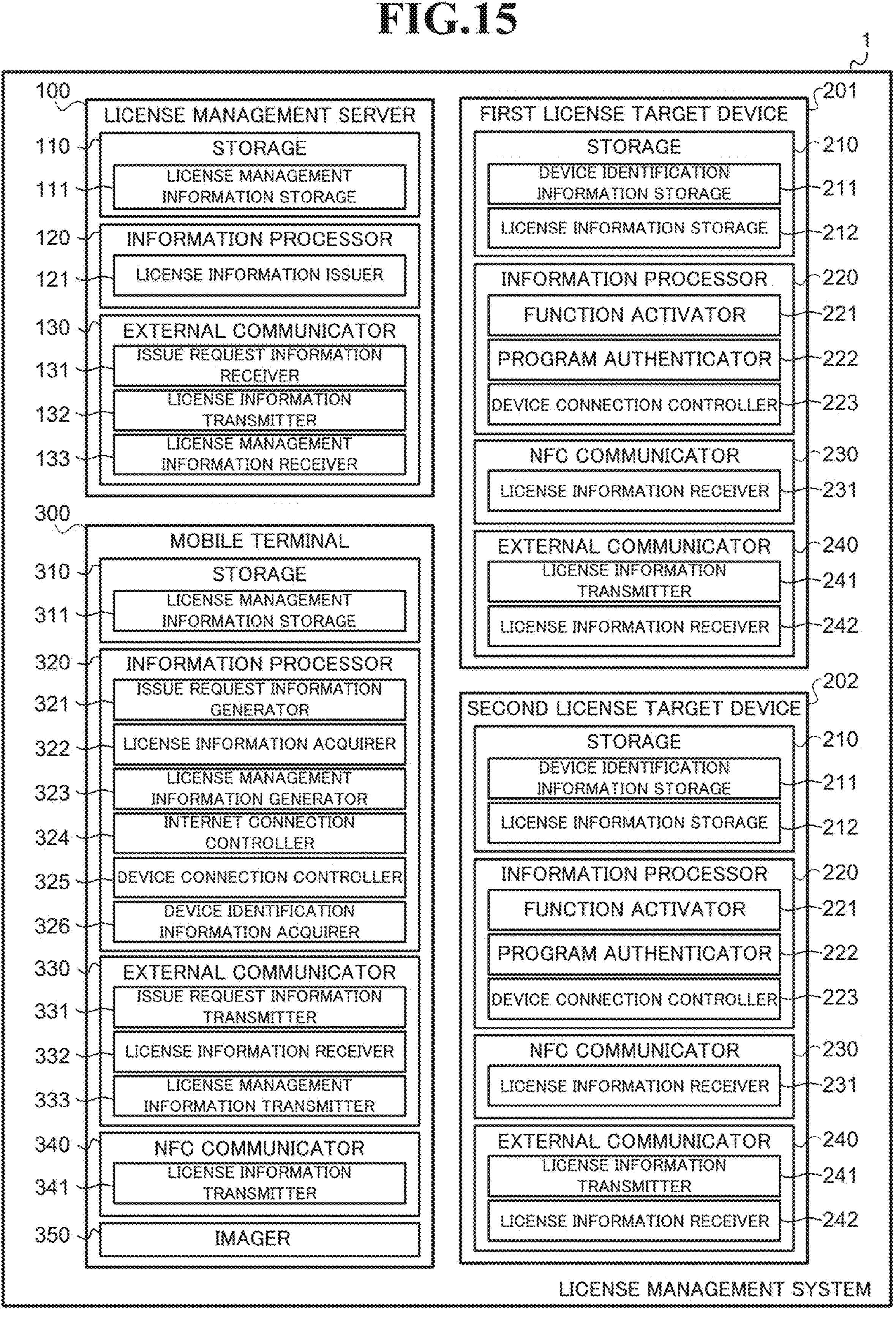
FIG. 15 is a functional block diagram of the license management system according to Embodiment 3.
Figure 16:
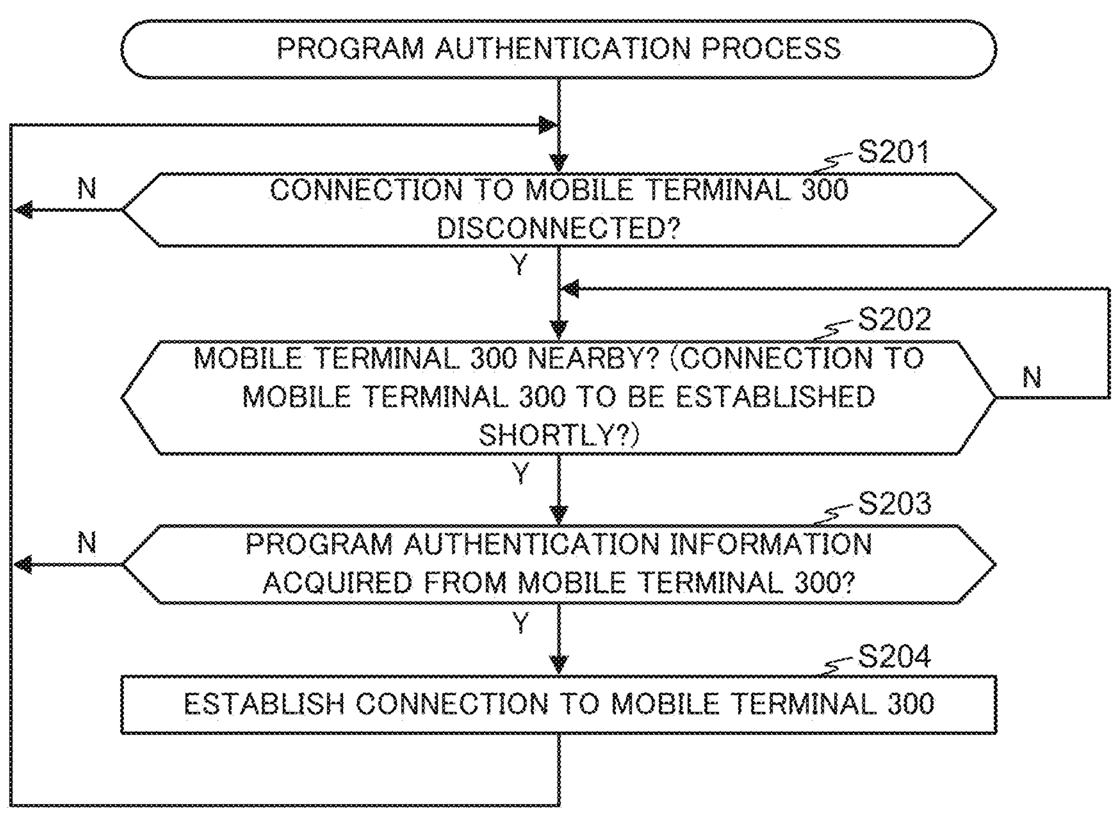
FIG. 16 is a flowchart of a program authentication process in Embodiment 3.

Similarly to the license target device 200 according to Embodiment 2, the license target devices 201 and 202 each include the components 210 to 212, 220, 221, 230, and 231 as illustrated in FIG. 15. The license target devices 201 and 202 each further include an external communicator 240 that communicates with the other of the license target devices 201 and 202 through the closed network 500. The external communicator 240 as an example of an information transmitter and an information receiver includes a license information transmitter 241 that transmits the license information and a license information receiver 242 that receives the license information. The information processor 220 also includes a program authenticator 222 that authenticates the program on the mobile terminal 300 and a device connection controller 223 that controls the NFC connection to the mobile terminal 300.

Hardware Configuration of License Target Devices 201 and 202

Although not illustrated, similarly to the license target device 200 according to Embodiment 2, the license target devices 201 and 202 each include a controller 51, a main storage 52, an external storage 53, an operation device 54, a display 55, and a transmitter-receiver 56. The controller 51 functions as the program authenticator 222 and the device connection controller 223 illustrated in FIG. 15 in accordance with the control program 59. The transmitter-receiver 56 functions as the license information transmitter 241 and the license information receiver 242.

The license target devices 201 and 202 each implement the functions of the above components 211, 212, 221 to 223, 231, 232, 241, and 242 illustrated in FIG. 15 with the controller 51 using the main storage 52, the external storage 53, the operation device 54, the display 55, and the transmitter-receiver 56 as resources. For example, the license target devices 201 and 202 each perform a program authentication step with the program authenticator 222 and a device connection controlling step with the device connection controller 223. For example, the license target devices 201 and 202 each perform a license information transmitting step as an example of an information transmitting step with the license information transmitter 241 and a license information receiving step as an example of an information receiving step with the license information receiver 242.

Details of Functional Configuration of License Target Devices 201 and 202

The program authenticator 222 verifies that the mobile terminal 300 holds a mobile terminal communication program including the above components 311, 321 to 326, 331 to 333, and 341 illustrated in FIG. 15. The program authenticator 222 determines whether the mobile terminal 300 holds the mobile terminal communication program based on whether the program authentication information indicating the mobile terminal communication program being held is acquired from the mobile terminal 300 when NFC connection is established to the mobile terminal 300.

When the mobile terminal 300 is adjacent to and is within about several centimeters from each of the license target devices 201 and 202, the device connection controller 223 establishes NFC connection to the mobile terminal 300. When the program authenticator 222 determines that the mobile terminal 300 holds no mobile terminal communication program, the device connection controller 223 establishes no NFC connection to the mobile terminal 300. In this case, the NFC connection to the mobile terminal 300 remains disconnected, and the license information receiver 231 receives no license information.

After the license information receiver 231 receives the license information from the mobile terminal 300 through NFC, the license information transmitter 241 transmits the license information to the other of the license target devices 201 and 202 through the closed network 500.

The license information receiver 242 receives the license information from the other of the license target devices 201 and 202 through the closed network 500. When the license information receiver 242 receives the license information, the function activator 221 stores the license information into the license information storage 212 and also activates the specific function.

Details of Functional Configuration of Mobile Terminal 300

Upon reception of the license information from the license management server 100, the license management information generator 323 generates license management information including the received license information and the preacquired device identification information about each of the license target devices 201 and 202. Although not illustrated, the license management information is, for example, information formed by connecting the character information License number: 123-456-7890 and the character information Production numbers: ABCD-123456 and ABCD-123457. The license management information generator 323 may, for example, separately generate the license management information about the first license target device 201 with the production number ABCD-123456 and the license management information about the second license target device 202 with the production number of ABCD-123457.

The device connection controller 325 outputs the above program authentication information to each of the license target devices 201 and 202 when establishing NFC connection to each of the license target devices 201 and 202.

Program Authentication

An operation performed by the license target devices 201 and 202 for performing program authentication to establish NFC connection to the mobile terminal 300 is described below with reference to a flowchart. The license target devices 201 and 202 each start the program authentication illustrated in FIG. 16 when powered on. The program authenticator 222 first determines whether the NFC connection to the mobile terminal 300 is disconnected (step S201). When the connection to the mobile terminal 300 remains connected (N in step S201), the program authenticator 222 repeats the processing in step S201 until the connection to the mobile terminal 300 is disconnected.

When the connection to the mobile terminal 300 is disconnected (Y in step S201), the program authenticator 222 determines whether the mobile terminal 300 is nearby to shortly establish NFC connection (step S202). When the mobile terminal 300 is not nearby (N in step S202), the program authenticator 222 repeats the processing in step S202 until the mobile terminal 300 comes nearby. When the mobile terminal 300 comes nearby (Y in step S202), the program authenticator 222 determines whether the program authentication information is acquired from the mobile terminal 300 (step S203).

When the program authentication information is acquired (Y in step S203), the program authenticator 222 determines that the mobile terminal 300 holds the mobile terminal communication program, and the device connection controller 223 establishes NFC connection to the mobile terminal 300 (step S204) and returns to step S201. When no program authentication information is acquired (N in step S203), the program authenticator 222 determines that the mobile terminal 300 holds no mobile terminal communication program, and the device connection controller 223 returns to step S201 without establishing NFC connection to the mobile terminal 300.

As described above, the license management system 1 according to the present embodiment allows the first license target device 201 and the second license target device 202 to transmit and receive information to and from each other through the closed network 500 unconnectable to the Internet 400. When the license information receiver 231 in either the first license target device 201 or the second license target device 202 receives the license information from the mobile terminal 300 through NFC, the license target device 201 or 202 shares the license information by transmitting the license information to the other of the license target devices 201 and 202 through the closed network 500. The function activator 221 in each of the license target devices 201 and 202 activates the specific function based on the license information.

In this manner, simply transmitting the license information to one of the license target devices 201 and 202 that is connected to the mobile terminal 300 through NFC allows the user to share the license information with the other of the license target devices 201 and 202. The license management system 1 according to the present embodiment thus reduces the user's workload for activating the specific function on the license target devices 201 and 202 and improves convenience compared with a license management system in which the license information is transmitted to a single license target device and not shared with all license target devices.

In the present embodiment, the two license target devices, or the first license target device 201 and the second license target device 202, are installed. However, three or more license target devices may be installed. For three license target devices, for example, a third license target device 203 may be installed in addition to the first license target device 201 and the second license target device 202.

In the license management system 1 according to the present embodiment, the program authenticator 222 determines whether the mobile terminal 300 holds the mobile terminal communication program. When the program authenticator 222 determines that the mobile terminal 300 holds no mobile terminal communication program, the license information receiver 231 in each of the license target devices 201 and 202 maintains the NFC connection to the mobile terminal 300 disconnected.

In this manner, the license management system 1 according to the present embodiment prevents direct connection to each of the license target devices 201 and 202 from, for example, a mobile terminal that is an external device used by an unauthorized third person. As a result, in the license management system 1 according to the present embodiment, each of the license target devices 201 and 202 is less likely to be operated in an unauthorized manner from a mobile terminal used by a third person.

The license management system 1 according to the present embodiment also produces the same advantageous effects as the license management systems 1 according to Embodiments 1 and 2.

Although the mobile terminal 300 may generate the license management information to reduce the workload on the license management server 100 as described in Embodiments 1 to 3, the license management server 100 may generate the license management information. In this case, the mobile terminal 300 transmits the device identification information to the license management server 100 in place of the license management information. In Embodiment 2, the mobile terminal 300 may acquire the device identification information before receiving the license information, and thus the mobile terminal 300 may, for example, transmit issue request information with the device identification information included in the issue request information.

In Embodiment 1, when being moved away from the license target device 200 to establish connection to the Internet 400, the mobile terminal 300 transmits the license management information to the license management server 100. However, the license management information may be transmitted at a different time. For example, the license management information may be transmitted to the license management server 100 when a predetermined period of time has elapsed after the mobile terminal 300 is moved away from the license target device 200 to establish connection to the Internet 400. This allows the mobile terminal 300 to have a sufficient time to generate the license management information.

In Embodiment 2, the mobile terminal 300 transmits the license management information to the license management server 100 before coming adjacent to the license target device 200 to establish NFC. However, the license management information may be transmitted at a different time. For example, the mobile terminal 300 may transmit the license management information to the license management server 100 when being moved away from the license target device 200 to re-establish the connection to the Internet 400. In this manner, similarly to Embodiment 2, the mobile terminal 300 may transmit the license management information to the license management server 100 when the specific function is activated by providing the license information to the license target device 200.

In Embodiments 1 to 3, the license management system 1 including the license management server 100, the license target device 200, and the mobile terminal 300 is illustrated as an example of a communication system. However, the communication system may be any other communication system including a mobile terminal used by a user and a control device. For example, the mobile terminal in the communication system may transmit and receive monitoring information about the control device to and from a monitoring server that is an example of an external device connected through the Internet and may also transmit and receive control information to and from the control device through NFC. In this case as well, when the mobile terminal and the control device are connected through NFC, no connection is established between the mobile terminal and the Internet, and an external terminal used by a third person cannot connect to the mobile terminal through a communication network. When the mobile terminal and the control device are connected to each other, the external terminal cannot connect to the control device through the mobile terminal. In the communication system, the control device is thus less likely to be operated in an unauthorized manner by a third person than in a communication system in which the mobile terminal and the Internet are connected constantly when the mobile terminal and the control device are connected.

The main processing parts of the license management server 100, the license target device 200, and the mobile terminal 300 each including the controller 51, the main storage 52, the external storage 53, the operation device 54, the transmitter-receiver 56, and the internal bus 50 may provide the license management server 100, the license target device 200, and the mobile terminal 300 with a program for performing the above processing. For example, a program for performing the above operations may be stored in a non-transitory recording medium, such as a flash memory, readable by the license management server 100, the license target device 200, and the mobile terminal 300 for distribution and installed to perform the above processes.

For example, a mobile terminal communication program including the above components 311, 321 to 325, 331 to 333, 341, and 342 illustrated in FIGS. 3, 12, and 15 may be stored in a non-transitory recording medium. In this case, the mobile terminal 300 may install the mobile terminal communication program read from the non-transitory recording medium into the mobile terminal 300 to implement the functions of the components 311, 321 to 325, 331 to 333, 341, and 342.

The program may also be stored in a storage for a server that is an external device on a communication network such as a LAN or the Internet and may be downloaded by the license management server 100, the license target device 200, and the mobile terminal 300 to provide a computer.

In the system with the functions of the license management server 100, the license target device 200, and the mobile terminal 300 implementable by the operating system (OS) and an application program in a shared manner or through cooperation between the OS and the application program, portions executable by the application program may be stored in a non-transitory recording medium or a storage.

The program may be superimposed on a carrier wave to be distributed through a network. For example, the computer program may be posted on a bulletin board system (BBS) on the communication network to be provided through the communication network. The computer program may be activated and executed under the control of the OS in the same manner as another application program to perform the above processing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 License management system
50 Internal bus
51 Controller
52 Main storage
53 External storage
54 Operation device
55 Display
56 Transmitter-receiver
59 Control program
100 License management server
110, 210, 310 Storage
111 License management information storage
120, 220, 320 Information processor
121 License information issuer
130, 240, 330 External communicator
131 Issue request information receiver
132, 241, 341 License information transmitter
133 License management information receiver
200 License target device
201 First license target device
202 Second license target device
211 Device identification information storage
212 License information storage
221 Function activator
222 Program authenticator
223 Device connection controller
230, 340 NFC communicator
231, 242 License information receiver
232 Device identification information transmitter
300 Mobile terminal
311 License management information storage
321 Issue request information generator
322 License information acquirer
323 License management information generator
324 Internet connection controller
325 Device connection controller
326 Device identification information acquirer
331 Issue request information transmitter
332 License information receiver
333 License management information transmitter
342 Device identification information receiver
350 Imager
400 Internet
500 Closed network

The invention claimed is:

1. A communication system, comprising:
a mobile terminal operable by a user; and
a control device configured to communicate with the mobile terminal, wherein
the mobile terminal transmits and receives information to and from an external device through a communication network, and transmits and receives information to and from the control device through short-range wireless communication,
the mobile terminal and the control device each include processing circuitry and a transmitter-receiver,
the processing circuitry of the mobile terminal
controls connection to the communication network, and
controls connection to the control device through the short-range wireless communication,
the transmitter-receiver of the control device
receives the information from the mobile terminal through the short-range wireless communication, and
the processing circuitry of the mobile terminal disconnects the connection to the communication network when the mobile terminal is adjacent to the control device to establish connection to the control device through the short-range wireless communication.

2. A license management system, comprising:
the mobile terminal according to claim 1;
the control device according to claim 1; and
a license management server to manage a license, wherein
the control device is a license target device to which the license is provided,
the mobile terminal is operable by a user of the license target device,
the license management server includes processing circuitry, a transmitter-receiver, and a storage,
the processing circuitry of the license management server
issues license information indicating that the license is provided in response to a request from the user,
the processing circuitry of the mobile terminal
acquires the license information issued from the license management server,
the transmitter-receiver of the mobile terminal transmits the license information to the license target device through the short-range wireless communication,
the transmitter-receiver of the license target device receives the license information from the mobile terminal through the short-range wireless communication,
the processing circuitry of the license target device
activates a specific function based on the license information, and
the processing circuitry of the mobile terminal disconnects the connection to the communication network when the mobile terminal is adjacent to the license target device to establish connection to the license target device through the short-range wireless communication.

3. The license management system according to claim 2, wherein
the license target device comprises a first license target device and a second license target device different from the first license target device,
the first license target device and the second license target device are configured to transmit and receive information to and from each other through a closed communication network unconnectable to the communication network,
when the transmitter-receiver of one license target device of the first license target device and the second license target device receives the license information from the mobile terminal through the short-range wireless communication, the processing circuitry of the one license target device shares the license information with the other license target device of the first license target device and the second license target device through the closed communication network using the transmitter-receiver, and the processing circuitry of the first license target device and the processing circuitry of the second license target device activate a specific function based on the license information.

4. The license management system according to claim 3, wherein the transmitter-receiver of the license target device transmits device identification information for identifying the license target device to the mobile terminal through the short-range wireless communication when the license information is received, the transmitter-receiver of the mobile terminal receives the device identification information from the license target device through the short-range wireless communication, the processing circuitry of the mobile terminal generates license management information including the received device identification information and the license information, the transmitter-receiver of the mobile terminal transmits the license management information to the license management server through the communication network, the transmitter-receiver of the license management server receives the license management information from the mobile terminal through the communication network, and the storage of the license management server stores the license management information.

5. The license management system according to claim 4, wherein when the mobile terminal is moved away from the license target device and the connection to the license target device through the short-range wireless communication is disconnected, the processing circuitry of the mobile terminal establishes connection to the communication network, and when the connection to the communication network is established, the transmitter-receiver of the mobile terminal transmits the generated license management information to the license management server.

6. The license management system according to claim 3, wherein the processing circuitry of the mobile terminal acquires device identification information for identifying the license target device, and generates license management information including the device identification information and the license information, the transmitter-receiver of the mobile terminal transmits the license management information to the license management server through the communication network, the transmitter-receiver of the license management server receives the license management information from the mobile terminal through the communication network, and the storage of the license management server stores the license management information.

7. The license management system according to claim 6, wherein the processing circuitry of the mobile terminal establishes connection to the communication network before the mobile terminal is adjacent to the license target device to establish connection to the license target device through the short-range wireless communication, and the transmitter-receiver of the mobile terminal acquires the license information issued from the license management server and transmits the generated license management information to the license management server.

8. The license management system according to claim 2, wherein the transmitter-receiver of the license target device transmits device identification information for identifying the license target device to the mobile terminal through the short-range wireless communication when the license information is received, the transmitter-receiver of the mobile terminal receives the device identification information from the license target device through the short-range wireless communication, the processing circuitry of the mobile terminal generates license management information including the received device identification information and the license information, the transmitter-receiver of the mobile terminal transmits the license management information to the license management server through the communication network, and the transmitter-receiver of the license management server receives the license management information from the mobile terminal through the communication network, and the storage of the license management server stores the license management information.

9. The license management system according to claim 8, wherein when the mobile terminal is moved away from the license target device and the connection to the license target device through the short-range wireless communication is disconnected, the processing circuitry of the mobile terminal establishes connection to the communication network, and when the connection to the communication network is established, the transmitter-receiver of the mobile terminal transmits the generated license management information to the license management server.

10. The license management system according to claim 2, wherein the processing circuitry of the mobile terminal acquires device identification information for identifying the license target device, and generates license management information including the device identification information and the license information, the transmitter-receiver of the mobile terminal transmits the license management information to the license management server through the communication network, the transmitter-receiver of the license management server receives the license management information from the mobile terminal through the communication network, and the storage of the license management server stores the license management information.

11. The license management system according to claim 10, wherein the processing circuitry of the mobile terminal establishes connection to the communication network before the mobile terminal is adjacent to the license target device to establish connection to the license target device through the short-range wireless communication, and the transmitter-receiver of the mobile terminal acquires the license information issued from the license management server and transmits the generated license management information to the license management server.

12. A communication method, comprising:

establishing connection to a communication network allowing information to be transmitted and received to and from an external device and controlling the connection;

after establishing the connection to the communication network, acquiring the information through the communication network from the external device;

after acquiring the information, establishing connection to a control device through short-range wireless communication and controlling the connection;

after establishing the connection to the control device through the short-range wireless communication, transmitting, the information to the control device through the short-range wireless communication; and disconnecting the connection to the communication network when the connection to the control device is established through the short-range wireless communication.

13. A non-transitory computer-readable recording medium storing a mobile terminal communication program for causing a mobile terminal to execute instructions comprising:

acquiring information through a communication network allowing information to be transmitted and received to and from an external device;

controlling connection to a control device through short-range wireless communication;

transmitting the information to the control device through the short-range wireless communication; and controlling connection to the communication network and disconnecting the connection to the communication network when the connection to the control device is established through the short-range wireless communication.

14. A control device for a communication system including a mobile terminal operable by a user, the mobile terminal being configured to control connection to a communication network and control connection through short-range wireless communication, the mobile terminal being configured to transmit and receive information to and from an external device through the communication network, and transmit and receive information through the short-range wireless communication, the control device comprising:

processing circuitry; and a transmitter-receiver, wherein the transmitter-receiver receives the information from the mobile terminal through the short-range wireless communication, in a case where, when establishing the connection to the mobile terminal through the short-range wireless communication, the processing circuitry acquires, from the mobile terminal, program authentication information indicating that the mobile terminal holds the mobile terminal communication program according to claim 10, the processing circuitry verifies that the mobile terminal holds the mobile terminal communication program, the connection between the mobile terminal and the communication network is disconnected when the mobile terminal is adjacent to the control device to establish connection to the control device through the short-range wireless communication, and when the processing circuitry determines that the mobile terminal does not hold the mobile terminal communication program, the transmitter-receiver disconnects the connection to the mobile terminal through the short-range wireless communication.

* * * * *